Figure 1:
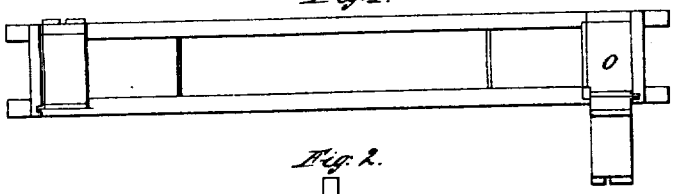
Figure 2:
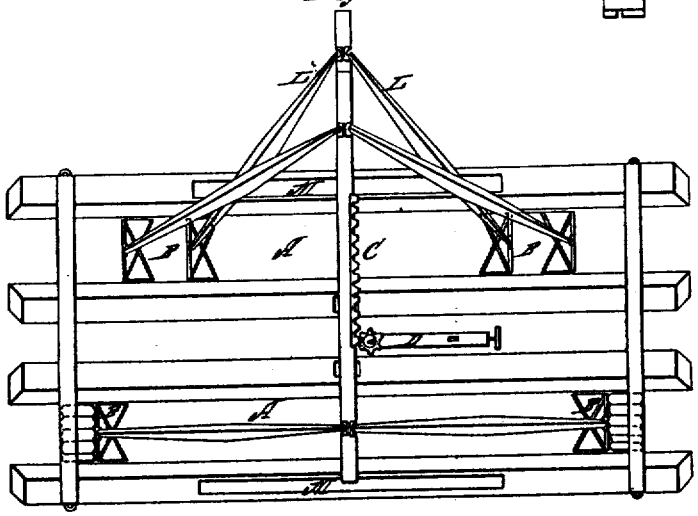
Figure 3:
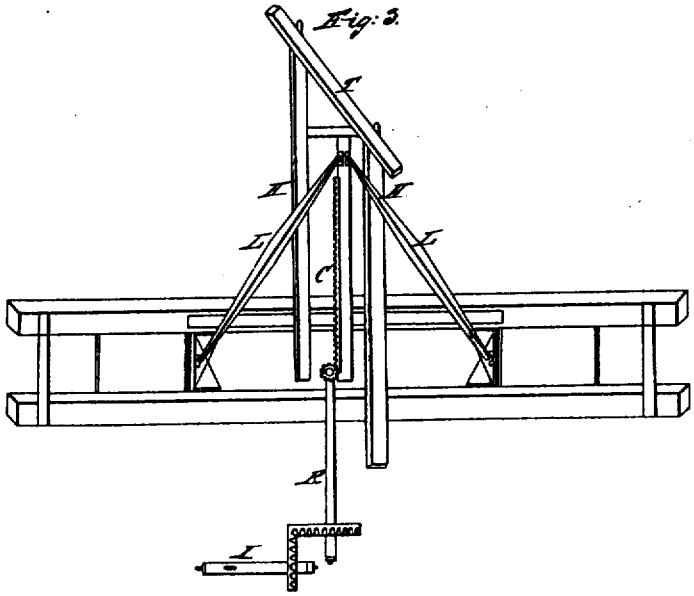

No Printed Specification Available

6910½X

Payne & Rundell,

Cotton Press,

Patented Jan. 25, 1832.

AM. PHOTO-LITHO. CO. N.Y. (OSBORNE'S PROCESS)

TEMPORARY NOTICE of BEST AVAILABLE IMAGE

U. S. PATENT AND TRADEMARK OFFICE

---

THE SCANNED IMAGES OF PATENT NUMBER 6910 1/2X FOR THE ISSUE DATE OF 1/25/1832. ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

---

TEMPORARY NOTICE of BEST AVAILABLE IMAGE